Nov. 18, 1969  F. MARTI  3,478,510
BEARING FOR WATCH PIECE PIVOT
Filed Feb. 12, 1968
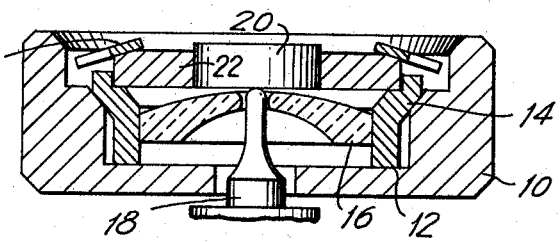
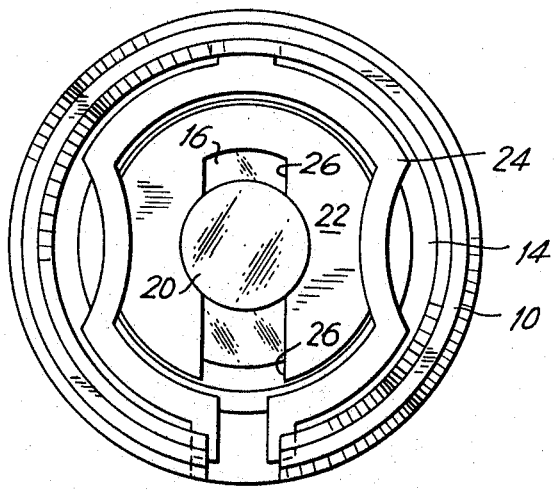
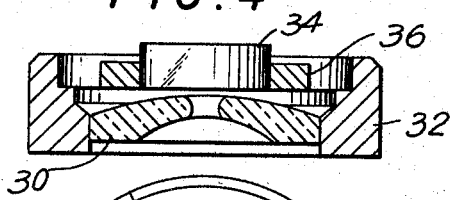
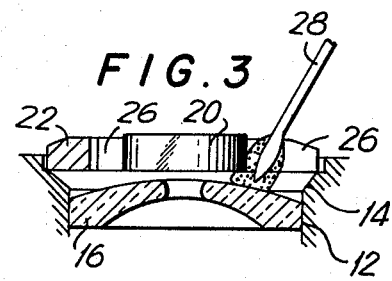
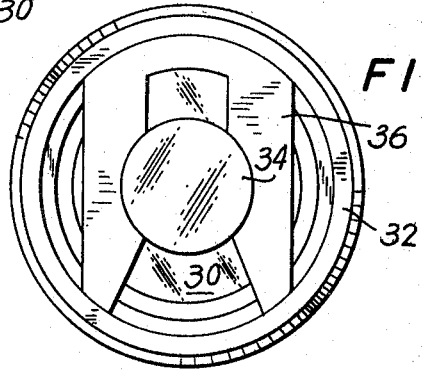
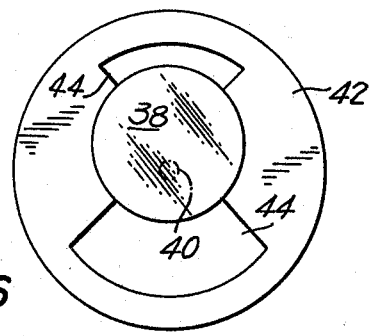
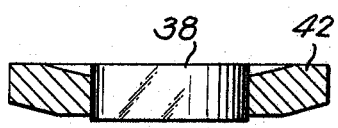
INVENTOR.
FRITZ MARTI
BY
Curtis, Morris & Safford
ATTORNEYS

United States Patent Office 3,478,510
Patented Nov. 18, 1969

3,478,510
BEARING FOR WATCH PIECE PIVOT
Fritz Marti, La Chaux-de-Fonds, Switzerland, assignor to Portescap, Le Port-Echappement Universel S.A., La Chaux-de-Fonds, Switzerland
Filed Feb. 12, 1968, Ser. No. 704,827
Claims priority, application Switzerland, Feb. 28, 1967, 2,889/67
Int. Cl. G04b *31/00*
U.S. Cl. 58—140                                        7 Claims

ABSTRACT OF THE DISCLOSURE

A watch bearing having a hole jewel and an end-piece which is fitted in a support and held adjacent to the back of the hole jewel. The end-piece with its support does not completely cover the back of the hole jewel allowing the bearing to be lubricated without removal or dismantlement.

---

The present invention relates to bearings for watch piece pivots, whether shock-dampening or not, which are composed of a hole jewel and an end-piece. Bearings of this type generally comprise a hole jewel, the upper surface of which, adjacent to the end-piece, is convex, and an end-piece having a diameter equal to or greater than the diameter of the hole jewel, facing the hole jewel, and located at a slight distance from it (a few hundredths of a millimeter).

In order to oil these bearings, whether they are removable or not, a drop of oil is introduced from below (as viewed by the person introducing the oil) into the hole of the hole jewel. When introduced, the drop of oil spreads out by capillary action in the area between the hole jewel and the end-piece. This bearing construction and oiling procedure, however, does not permit watch movements to be cleaned without removing the bearings and, in particular, does not permit watch bearings, particularly those intended to receive a balance staff, to be relubricated without removing them.

The present invention is directed specifically to affording the possibility of cleaning and relubricating watch bearings, thus simplifying repair operations. Its object is to provide a bearing for a watch piece pivot comprising a hole jewel and an end-piece, characterized by the fact that the end-piece consists of a jewel, which is smaller than the hole jewel over which it is located and which is press fitted in a support. The invention is further characterized by the fact that the support in which the end-piece is pressed to provide a force-fit is at least partially annular in shape and has at least one of its outside dimensions equal to or greater than the diameter of the hole jewel. Furthermore, the support includes at least one opening positioned so as to permit the introduction of a drop of oil from above (as viewed by a person introducing the oil), between the two jewels without having to dismantle the bearing.

The accompanying drawings show examples of three embodiments of the bearing which form the object of this invention.

FIGURE 1 is an axial section through the first embodiment.

FIGURE 2 is a plan view of the first embodiment.

FIGURE 3 is a partial axial section at right angles to FIGURE 1.

FIGURES 4 and 5 are in axial section and a plan view, respectively, of a second embodiment, and FIGURES 6 and 7 are partial views in plan view and in axial section, respectively, of a third embodiment.

The bearing of FIGURES 1 to 3 is a shock-dampening bearing for a balance staff. The bearing consists of a bearing body 10 on which there freely rests, on a conical surface, a mount 12 with a conical upper portion 14 in which there is fitted a hole jewel 16. The swinging of the hole jewel 16 with its mount 12 having conical upper portion 14 makes it possible in a known manner to take up the radial impacts which a shaft end may experience; for instance, impacts transmitted by the end of a balance staff 18 (see FIGURE 1).

An end-piece jewel 20 having a diameter approximately half that of the hole jewel 16 is press-fitted axially in an annular metal support 22 and is held elastically on an inner bearing surface of the conical upper portion 14 of the mount 12 by a lyre-shaped spring 24. The spring 24 is held removably in a known manner in an annular groove of the bearing body 10.

The metal support 22 has a rectangular radial opening 26 which uncovers a corresponding sector of the hole jewel 16. Through this opening it is possible to introduce from above, by means of an oil can 28, a drop of oil between the two jewels without taking apart the bearing (see FIGURE 3).

The bearing shown in FIGURES 4 and 5 is an ordinary bearing of the combined in-setting type. Here a hole jewel 30 is press-fitted in an in-setting 32. An end-piece jewel 34, half the size of its associated hole jewel, is press-fitted axially in a partially annular V-shaped metal support 36 which is press-fitted in the in-setting 32. The V-shaped support exposes between its arms, at both sides of the end-piece jewel 34, sectors of the hole jewel 30 and provides a means whereby a drop of oil can be introduced between the hole jewel and the end-piece, as in the case of the first embodiment.

In the embodiment of FIGURES 6 and 7 only an end-piece is shown. This end-piece is composed of a jewel 38 which is smaller, by about half, than is associated underlying hole jewel and which is press-fitted, eccentrically with respect to the axis 40 of the bearing, in a rigid or semi-rigid annular disc 42. The disc 42 has a central opening 44 which uncovers, at each side of the jewel 38, a sector of the underlying hole jewel. A drop of oil can thus be introduced from above onto the hole jewel without taking the bearing apart. The jewel 38 is preferably press-fitted in a combined in-setting as in the embodiment of FIGURES 4 and 5.

In all the embodiments, the annular or partially annular support with the oil opening can preferably be made of rigid or slightly elastic metal, or instance, of nickel steel. However, the support could also be made of molded material, for instance, of synthetic resin. In the case of synthetic resin, the end-piece jewel could be fastened axially or eccentrically by any suitable process so as to constitute with its support a monolithic assembly of general dimensions equal to or larger than the underlying hole jewel.

The invention has been described hereinabove, in preferred embodiments, but it is to be understood that the invention is in no way confined to the particular forms, uses or sizes shown and described and that numerous modifications or alterations may be made therein without departing from the spirit of the invention.

What is claimed is:

1. A bearing for a time-piece comprising, in combination, a bearing body, a hole jewel supported within said bearing body, said hole jewel having a front and back, said front being adapted to cooperate with the end of a shaft, an end piece in the form of a jewel smaller than said hole jewel, a support in which the end piece is pressed with a force fit, said support being at least partially annular with one outside dimension at least equal to the diameter of the hole jewel, said support seating on an annular shoulder on the bearing body to position said end piece adjacent the back of said hole jewel in spaced relation thereto to provide an open space therebetween, and said support having at least one opening between the end piece and bearing body through which oil may be introduced from above into the open space between the two jewels without taking the bearing apart.

2. A bearing for a time-piece as described in claim 1 in which the back of the hole jewel is curved to form an annular space between it and the end piece having a gradually decreasing dimension from the periphery toward the center.

3. A bearing as described in claim 1, wherein the support for the end-piece jewel is composed of a metal such as nickel steel.

4. A bearing as described in claim 1, wherein the end-piece jewel is fastened in its support in a position which is eccentric with respect to the axis of the bearing.

5. A bearing as described in claim 1 wherein the support is force-fitted in an in-setting member in which the hole jewel is pressed with a force fit.

6. A bearing for a time piece comprising, in combination, a bearing body, a hole jewel having a front and back, said front adapted to cooperate with a pivotal end of a shaft, an annular support having an end-piece jewel fitted therein, an annular mount in the bearing body, said support being seated on an annular shoulder in the mount, said mount containing said hole jewel and having an inclined bearing surface resting on a correspondingly shaped surface of said bearing body, said body having at least one recess groove, said support and jewel being held adjacent to the back of said hole jewel by a spring engaged in said recess groove in the bearing body and said support having one or more apertures therein whereby lubricant can be introduced onto the back of said hole jewel.

7. A bearing for a time piece as described in claim 6 wherein said spring engaged in said recessed groove of said bearing body is a lyre-shaped spring.

References Cited

UNITED STATES PATENTS

| 2,671,309 | 3/1954 | Marti et al. | 58—140 |
| 2,886,943 | 5/1959 | Hugenin | 58—140 |
| 2,973,618 | 3/1961 | Morf | 58—140 |

FOREIGN PATENTS

| 1,049,614 | 8/1953 | France. |
| 1,093,308 | 11/1954 | France. |
| 1,339,842 | 9/1963 | France. |
| 331,598 | 9/1958 | Switzerland. |
| 353,685 | 5/1961 | Switzerland. |

RICHARD B. WILKINSON, Primary Examiner

S. A. WAL, Primary Examiner